Sept. 28, 1937.　　　　M. GLOWKA　　　　2,094,429
SAFETY SYSTEM FOR AIRPLANES
Filed March 9, 1937　　　2 Sheets-Sheet 2
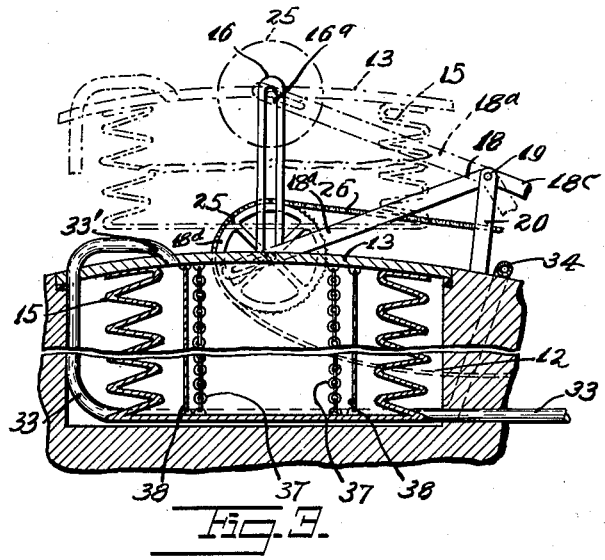
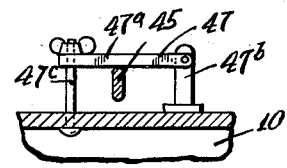
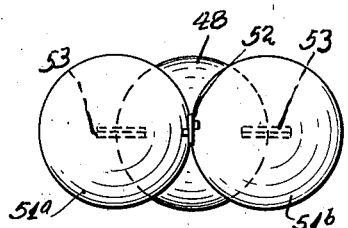
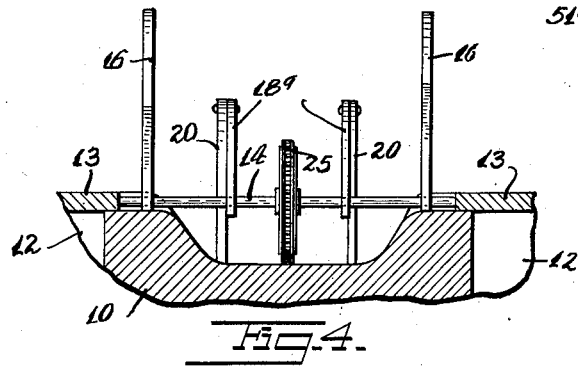
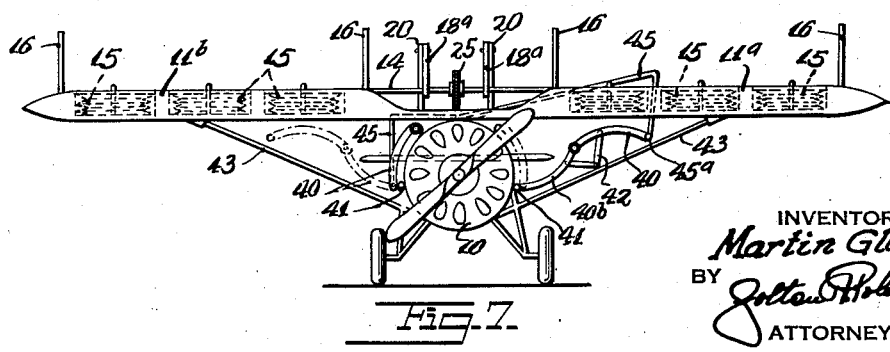
INVENTOR
Martin Glowka
BY
ATTORNEY Patented Sept. 28, 1937

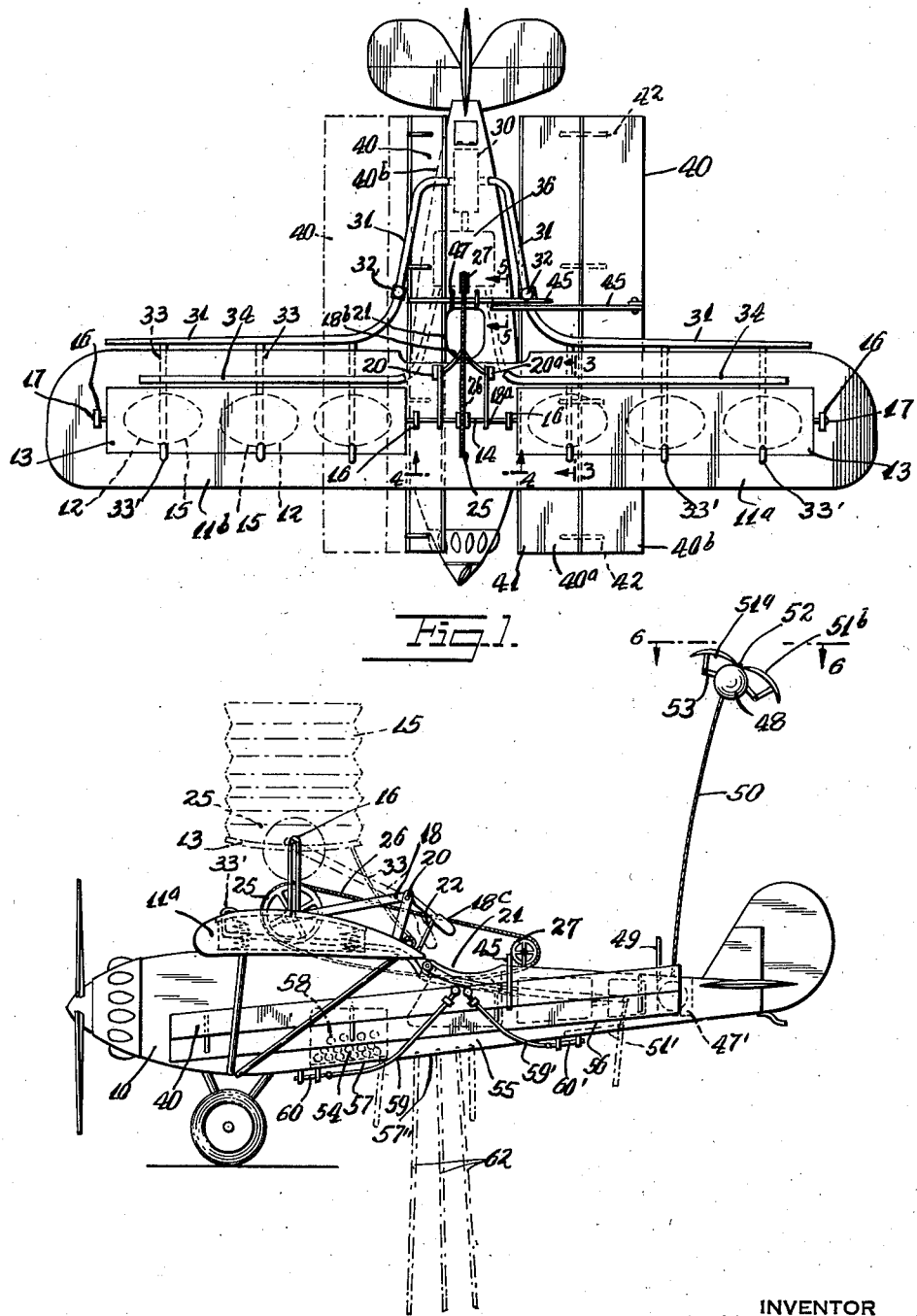

2,094,429

UNITED STATES PATENT OFFICE 2,094,429

SAFETY SYSTEM FOR AIRPLANES

Martin Glowka, New York, N. Y.

Application March 9, 1937, Serial No. 129,781

7 Claims. (Cl. 244—139)

This invention relates to new and useful improvements in a safety system for airplanes.

The invention has for an object the association with an airplane having a fuselage and stationary wings on opposite sides thereof, of cavities formed in the top sides of said wings and housing inflatable bags mounted on covers for the cavities, and an arrangement whereby the covers may be lifted and inverted to extend the bags.

The invention proposes the provision of mechanism for inflating the bags with "light" gases to give the airplane buoyancy when required.

Still further the invention proposes the provision of extendable pontoons mounted along the sides of the fuselage and adapted to be extended when required to add to the buoyancy of the airplane.

Another one of the objects of this invention resides in the provision of a signal balloon adapted to be released from a compartment within the fuselage of the airplane to signal that the airplane is in distress.

Still further the invention proposes several trap doors in the bottom of the fuselage enclosing several compartments, for a different purpose. It is proposed to have a compartment with ropes which may be dropped so that the airplane may be hauled down if the occasion warrants. It is also proposed that ballast be stored in the other compartments which may be released in emergencies.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a plan view of an airplane constructed according to this invention.

Fig. 2 is a side elevational view of the airplane shown in Fig. 1.

Fig. 3 is a fragmentary enlarged sectional view taken on the line 3—3 of Fig. 1.

Fig. 4 is a fragmentary enlarged sectional view taken on the line 4—4 of Fig. 1.

Fig. 5 is a fragmentary enlarged sectional view taken on the line 5—5 of Fig. 1.

Fig. 6 is a fragmentary elevational view looking in the direction of the line 6—6 of Fig. 2.

Fig. 7 is a front elevational view of the airplane.

The safety system for airplanes, according to this invention, is used in combination with an airplane having a fuselage 10 and stationary wings 11$^a$ and 11$^b$ on opposite sides and at right angles to the fuselage. Each of these wings is formed with cavities 12 extended in from the top sides. Covers 13 are mounted on each of the wings for closing the cavities. These covers are connected together by a rod 14 extending over the fuselage. Inflatable bags 15 are mounted on the undersides of the covers 13 and extend into the cavities 12. Means is provided for raising said rod 14 to lift the covers 13 upwards and move the bags 15 out of the cavities. Another means is provided for turning the rod 14 to turn the covers 13 so that the bags 15 are then at the top. Still another means is provided for inflating the bags 15 when they are at the top with "light" gases to buoy the airplane.

The rod 14 extends through slots 16$^a$ in vertically extending brackets 16 which are mounted upon the top of the fuselage 10. The extremities of the covers 13 have projecting studs 17 which engage through elongated slots in identical brackets 16 which are mounted upon the top face of the wings 11$^a$ and 11$^b$. These studs 17 and the brackets 16 are merely for the purpose of more securely holding the covers 13 when they are lifted off the cavities.

The means for lifting the rod 14 includes a bell crank 18 which is pivotally mounted by pintles 19 on vertical supporting brackets 20. The bell crank 18 is of yoke shape. It is provided with a pair of front arms 18$^a$ formed with slots 18$^d$ which engage the rod 14 at spaced positions. The arms 18$^a$ connect with a rear joining portion 18$^b$ which terminates in a handle 18$^c$ in the vicinity of the pilot's cockpit 21. Thus the pilot may manually move the handle 18$^c$ for manually raising and lowering the rod 14. A latch 22, which comprises an arm which is pivotally mounted at its bottom end 22$^a$ and has its top end engaging the handle 18$^c$, prevents the handle from being depressed. It is necessary that this latch 22 be pivoted to an inoperative position before it is possible to depress the handle and so lift the rod 14.

The means for turning the rod 14 comprises merely a hand wheel 25 which is mounted on the rod 14 and which is engaged by a sprocket chain or similar element 26 extending rearwards to an idler pulley 27 in the vicinity of the cockpit 21 of the airplane. Therefore, the chain or other element 26 may be conveniently reached, and may be manually moved for turning the wheel 25 and so turning the rod 14.

The means for inflating the bags 15 includes a storage tank 30 mounted in the back of the fulselage 10 and in which highly compressed "light" gases are stored, such as helium, hydrogen and the like. Supply pipes 31 extend from this tank and are controlled by valves 32 readily reachable by the pilot of the airplane. These supply pipes 31 continue and connect with branch pipes 33 which have end portions 33' discharging into the bags 15 (see particularly Fig. 3). Thus when the valves 32 are opened the gases will inflate the bags 15. There are other pipe lines 34 which also connect with the end portions 33' of the pipes 33 and which connect with a motor driven compressor 36 adapted to return the expanded gases in compressed condition, back into the storage tank 30.

The inflatable bags 15 are limited in the extent to which they may inflate, by normally loose chains 37 and loose cords or wires 38 mounted within each of the bags and connected between the base ends of the top ends of the bags. The bags may expand until they are restrained from further expansion by the tightening of the chains and cords 37 and 38, respectively.

Foldable pontoon elements 40 are associated with the sides of the fuselage and are adapted to be contracted and expanded as required. Each of these pontoon elements comprises a pair of adjacent pontoon sections 40ª and 40ᵇ which are hingedly connected with each other along one of their sides. The inner section 40ª is hingedly connected upon a rod 41 attached longitudinally along one side of the fuselage 10. Hinged braces 42 are connected between the pontoon sections 40ª and 40ᵇ and are for the purpose of reinforcing the sections.

Each pontoon section 40 is extendible between braces 43 for the airplane wings 11ª and 11ᵇ, and the wings themselves. Each of the pontoon sections 40ª and 40ᵇ is curved so as to be capable of fitting one within the other and against the curved side of the fuselage. In Figs. 1 and 7 the pontoon 40 at the left is shown in the folded position. The pontoon 40 at the right is shown extended.

Each pontoon 40 is controlled by a handle 45 which is of L-shape. The head of this handle is pivotally connected at the point 45ª with the outer extreme edge of the outer pontoon element 40ᵇ. The handle 45 extends inwards beneath a hand releasable clamp 47. This clamp comprises a clamp rod 47ª pivotally mounted at one end upon a bracket 47ᵇ which is mounted in the fuselage, and which extends over the handle 45 and connects with a holding clamp screw 47ᶜ. The clamp screw 47ᶜ may be released or loosened to free the handle 45 which then may be manually moved to open or close the pontoon elements similar to the opening and closing of an umbrella.

The pontoon elements may be locked in the closed position as shown in the left hand side in Fig. 7, or may be manually extended to the open position shown at the right hand side of Fig. 7. These pontoon elements are adapted to add to the wing spread of the plane when emergencies arise, and should the plane settle on water they are used to float the plane.

The fuselage 10 is provided with a compartment 47' in which a signal balloon 48 is normally housed. This compartment is closed by a hinged door 49 which may be released and opened as desired. The signal balloon 48 is connected with a cord 50 so that it may rise a pre-determined amount above the airplane and maintain this position. To add to its buoyancy it is provided with semi-spherical wing shaped elements 51ª and 51ᵇ which are hingedly supported at the points 52 on the top of the signal balloon 48. There are hinged braces 53 adapted to reinforce and hold the wing shaped elements 51ª and 51ᵇ in their extended positions. These braces may be collapsed when the balloon is drawn down and the wing shaped elements folded against the sides of the balloon and stored within the compartment 47. An alarm siren may also be made to operate when the signal balloon 48 is released.

The bottom of the fuselage 10 is formed with several compartments 54, 55 and 56. Each of these compartments is closed with a door. There is a door 57 closing the compartment 54. This compartment holds "shot" 58 or other elements which may be dumped to lighten the weight of the airplane. A cable 59 extends from a latch 60 which normally holds the door 57 closed, to the airplane cockpit so that it may be drawn by the pilot to cause the door to open. The compartment 56 is provided with a door 57' which is controlled by a latch 60' operated by a cable 59'. The compartment 55 is closed by a door 57''. It holds a plurality of ropes 62 which may be dropped when desired so that people on the ground may pull downwards on the airplane, or these ropes may be used to allow someone to board the plane from another plane during flight.

The operation of the device is as follows:—

Normally, the pontoons 40 are in their collapsed positions, and the covers 13 are extended over the cavities 12 with the expandible bags 15 within the cavities. The airplane then flies in a conventional manner. Should the pilot desire to add to the buoyancy of the machine it is necessary that the latch 22 be disengaged from the handle 18ᶜ which may then be depressed to pivot the bell crank 18 and so raise the rod 14. Since the covers 12 are rigidly connected with the rod they will be lifted to the position shown by the dot and dash lines in Fig. 2. Then the chain 26 is moved to rotate the wheel 24 to turn the covers 12 so that the bags 15 are now at the top. The valves 32 are then opened and the "light" weight gas will enter the bags 15 and inflate them.

The pontoons 40 may be spread when desired from their normally folded positions by first releasing the handles 45 and then manually spreading the pontoons and finally re-clamping the handles 45 by the same clamp 47, but in their extended positions.

The signal balloon 48, the ropes 62, and the shot 58 may be released as required.

A suitable compressor may also be provided for driving an air turbine, together with the gases in the air bags 15. This air turbine may be connected to the propeller of the airplane, and used in case the motor stalls.

While I have illustrated and described the preferred embodiments of my invention, it is to be understood that I do not limit myeslf to the precise constructions herein disclosed and the right is reserved to all changes and modifications coming within the scope of the invention as defined in the appended claims.

Having thus described my invention, what I claim as new, and desire to secure by United States Letter Patent is:—

1. In combination with an airplane having a fuselage and stationary wings on opposite sides thereof with cavities formed in the top sides of said wings, a cover on each wing for said cavities, a rod between and connecting said covers, inflatable bags mounted on said covers and extended into said cavities, means for raising said rod to lift said covers, means for turning said rod to turn the covers to place the bags at the top, and means for inflating said bags with light gases.

2. In combination with an airplane having a fuselage and stationary wings on opposite sides thereof with cavities formed in the top sides of said wings, a cover on each wing for said cavities, a rod between and connecting said covers, inflatable bags mounted on said covers and extended into said cavities, means for raising said rod to lift said covers, means for turning said rod to turn the covers to place the bags at the top, and means for inflating said bags with light gases, said rod being supported in vertical slots of stationary brackets.

3. In combination with an airplane having a fuselage and stationary wings on opposite sides thereof with cavities formed in the top sides of said wings, a cover on each wing for said cavities, a rod between and connecting said covers, inflatable bags mounted on said covers and extended into said cavities, means for raising said rod to lift said covers, means for turning said rod to turn the covers to place the bags at the top, and means for inflating said bags with light gases, said rod being supported in vertical slots of stationary brackets, and auxiliary brackets being mounted upon the wings and formed with slots into which studs from the extremities of the covers engage to assist in supporting the covers.

4. In combination with an airplane having a fuselage and stationary wings on opposite sides thereof with cavities formed in the top sides of said wings, a cover on each wing for said cavities, a rod between and connecting said covers, inflatable bags mounted on said covers and extended into said cavities, means for raising said rod to lift said covers, means for turning said rod to turn the covers to place the bags at the top, and means for inflating said bags with light gases, said means for lifting the rod comprising a bell crank pivotally mounted and having a forked end formed with slots in the fingers thereon engaging said rod, and a handle on the other end of the bell crank by which it may be moved.

5. In combination with an airplane having a fuselage and stationary wings on opposite sides thereof with cavities formed in the top sides of said wings, a cover on each wing for said cavities, a rod between and connecting said covers, inflatable bags mounted on said covers and extended into said cavities, means for raising said rod to lift said covers, means for turning said rod to turn the covers to place the bags at the top, and means for inflating said bags with light gases, said means for turning the rod comprising a wheel fixed on the rod, and a chain or similar element extended over the wheel and extended to the vicinity of the pilot of the airplane.

6. In combination with an airplane having a fuselage and stationary wings on opposite sides thereof with cavities formed in the top sides of said wings, a cover on each wing for said cavities, a rod between and connecting said covers, inflatable bags mounted on said covers and extended into said cavities, means for raising said rod to lift said covers, means for turning said rod to turn the covers to place the bags at the top, and means for inflating said bags with light gases, comprising a storage tank with compressed gases, pipes from the storage tank into the interiors of said bags, and valves for controlling the passage of the gases through said pipe.

7. In combination with an airplane having a fuselage and stationary wings on opposite sides thereof with cavities formed in the top sides of said wings, a cover on each wing for said cavities, a rod between and connecting said covers, inflatable bags mounted on said covers and extended into said cavities, means for raising said rod to lift said covers, means for turning said rod to turn the covers to place the bags at the top, and means for inflating said bags with light gases, comprising a storage tank with compressed gases, pipes from the storage tank into the interiors of said bags, and valves for controlling the passage of the gases through said pipe, and a compressor and means for returning the expanded gases to the storage tank.

MARTIN GLOWKA.